July 14, 1925.
S. J. ERLING
1,545,645
AUTOMATIC CLOSING DEVICE
Filed Feb. 27, 1923
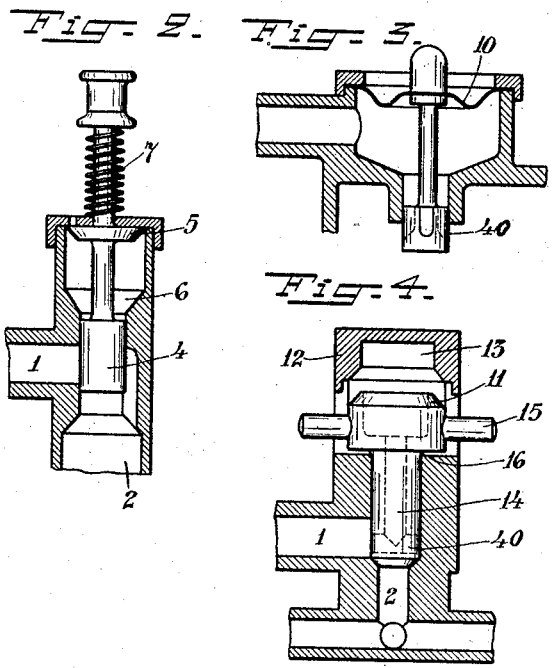
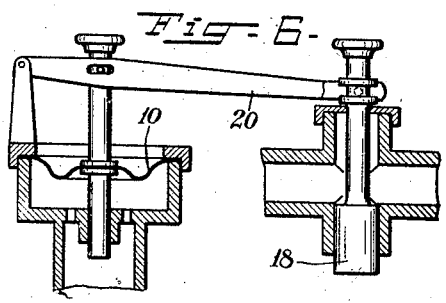
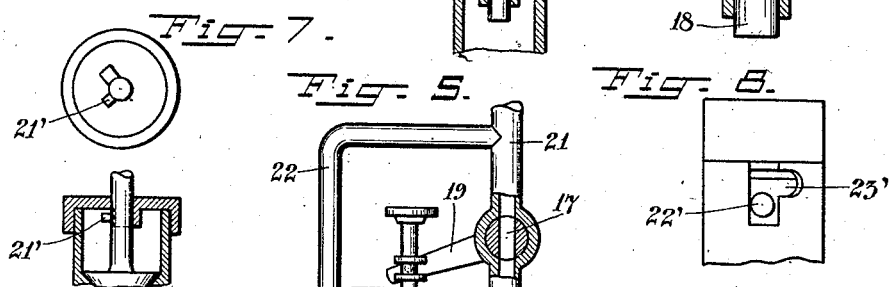
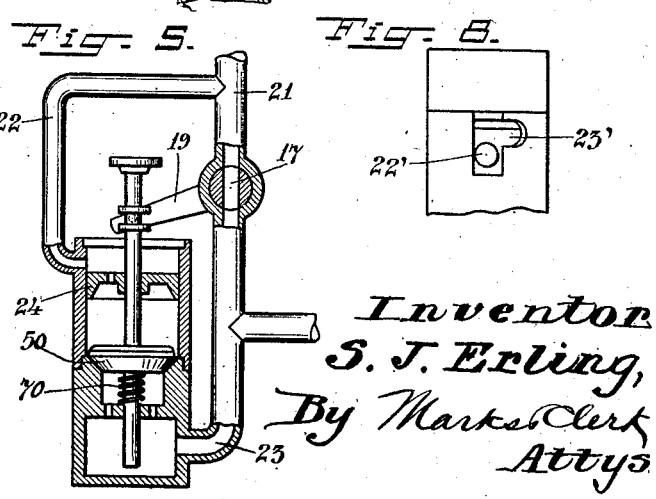
Inventor
S. J. Erling,
By Marks Clerk
Attys Patented July 14, 1925.

1,545,645

UNITED STATES PATENT OFFICE.

SVEN JOHAN ERLING, OF HUVUDSTA, SWEDEN, ASSIGNOR, BY MESNE ASSIGNMENTS, TO THE DE LAVAL SEPARATOR COMPANY, OF NEW YORK, N. Y., A CORPORATION OF NEW JERSEY.

AUTOMATIC CLOSING DEVICE.

Application filed February 27, 1923. Serial No. 621,651.

*To all whom it may concern:*

Be it known that I, SVEN JOHAN ERLING, a subject of the King of Sweden, residing at Huvudsta, Sweden, have invented certain new and useful Improvements in Automatic Closing Devices, of which the following is a specification.

In milking machines operable by a partial vacuum, the teat cups of a milking unit are held in position on the teat of the cow by means of suction within the cup and atmospheric pressure outside the cup. Unless the partial vacuum within the cup is maintained at or above a predetermined degree, the cup will slip off the teat. Such reduction of partial vacuum may occur as a result of excessive leakage of air into the cup. If the cup slips off the teat, a large amount of air will be sucked into the piping through the free suction opening, which air on passing through the milk pail deposits impurities brought with it, thus contaminating the milk, especially if the teat cup assumes such a position that the suction opening becomes directed downwards. Further, the absolute pressure in the milk pail and in the main vacuum line and in the pipe connection to other milking units will rise, seriously affecting the efficiency and operativeness of the milking machine. Those milking units that communicate with the same milk pail as the milking unit that has been put out of work are especially affected. If such free influx of air is of too long duration, the teat cups of all the milking members may slip off their corresponding teats.

The object of the present invention is to prevent any fall in the vacuum within any section of piping communicating with the main vacuum pipe line from causing a serious drop in pressure within such line, whereby if, due to local conditions, the vacuum within any given milking unit falls below a predetermined degree, it will not cause a corresponding fall in the vacuum in the main pipe line or in other milking units. In my invention, this result is accomplished by positioning an automatic cut-off valve at any suitable point between two pipe sections, one of which communicates with one or more milking units or with a milk pail and the other of which communicates with the main vacuum line; by causing the valve to be held open by the difference between the pressure of the atmosphere and the lower absolute pressure within the piping; and by providing a tension device, such as a weight or spring, which tends to close the valve but which is not strong enough to effect said closure unless the absolute pressure within the piping rises to a predetermined degree so as to reduce to a predetermined value the difference between such absolute pressure and that of the atmosphere.

In the following description, it may be assumed that the cut-off valve is arranged between a milk pail and the main vacuum line connected with a vacuum pump; or in any suitable pipe connection between a set of teat cups and the main vacuum line.

In the drawings, which show different embodiments of the invention—

Figs. 1 and 2 are vertical sectional views of one embodiment of my invention, Fig. 1 showing the cut-off valve in normal open position and Fig. 2 showing such valve in position to close communication between pipe sections.

Figs. 3, 4, 5 and 6 are vertical sections of other embodiments of my invention.

Figs. 7 and 8 are detail views showing means to temporarily lock the cut-off valve in open position.

Referring first to Figs. 1 and 2: The casing therein shown has channels 1 and 2 connected with communicating pipe sections in one of which it is desired to prevent any serious or continued drop in the partial vacuum. Within the casing is a piston valve 4 and a conical control valve 5 on a common stem which extends through the head of the casing. The casing is provided with a groove, which establishes free communication between channels 1 and 2 when the piston valve 4 is in the position shown. The piston valve is held in this position by atmospheric pressure acting to hold the control valve 5 on its seat 6. The atmospheric pressure is transmitted through a hole 8 to the chamber 9 above the valve 6. A spring 7 tends to lift the control valve 5 off its seat, but is not of sufficient strength to overcome the pressure of the atmosphere. When, however, the vacuum in the pipe sections is weakened to a predetermined degree, the spring 7 is of sufficient strength to overcome the difference in absolute pressures on opposite sides of the valve 5 and the valve 5 is lifted into the position shown in Fig. 2, thereby shifting the piston valve 4 into position to close communication between channels 1 and 2.

In Fig. 3 a modification is shown. The spring is replaced by a diaphragm 10 connected with the piston 40, one surface of said diaphragm being continuously actuated by the higher pressure of the surrounding medium (atmosphere), while the other surface thereof is actuated by the lower absolute pressure which prevails within the closing device. In this modification the piston valve 40 is provided with axially extending lateral grooves which are opened when the valve is lowered and closed when the valve is raised.

In Fig. 4 an embodiment is shown in which the tension means is a weight instead of a spring and the connection between the channels 1 and 2 is broken by the lower end of the piston (which end has the form of a valve cone) bearing on a corresponding valve seat around the opening of the channel 2. If the piston is lifted so that the valve cone 11 on its upper end bears tightly on a valve seat in the cover 12, the connection between channels 1 and 2 opens. The piston is held in the last mentioned position so long as the partial vacuum in channels 1 and 2 does not fall below a predetermined degree, because the upper and lower end surfaces of the piston are both subject to the lower pressure, the chamber 13 being brought into communication with the channel 1 through the channel 14 when the piston assumes its upper position. In this position the pin 15 prevents the piston from being rotated. The annular surface 16 of the piston being actuated by the atmospheric pressure, a surplus force is obtained which, during regular working, is greater than the weight of the piston which is to be adjusted according to the determined difference in absolute pressures. If the vacuum within the closing device weakens beyond a predetermined degree, the piston drops by its own weight to its lower position.

In the embodiments described above, the closing and controlling means are comprised in one integral device, or they have been rigidly connected. For certain purposes, it may, however, be suitable to arrange the controlling and closing members in separate casings. In Figs. 5 and 6 two embodiments of that kind are shown. Fig. 5 shows a plug cock 17 connected by a lever 19 to the stem of a control valve 50 normally seated within the valve casing and actuable by a spring 70. Cock 17 is inserted in a pipe 21 which is connected to the valve casing by branch pipes 22 and 23. Connected to the stem of valve 50 is a valve 24. When the control valve 50 is lifted, valve 24 closes the inlet of pipe 22 into the valve casing and lever 19 turns cock 17 into position to close communication through pipe 21.

Fig. 6 shows a piston valve 18 actuated by a diaphragm 10 arranged in accordance with Fig. 3 and adapted to swing a lever 20 into position to lift the valve 18 into position to cut off communication between the two pipe sections.

By suitable adjustments of the tension devices and (in the forms shown in Figs. 5 and 6) by varying the lengths of the levers, the capacities of the controlling devices may be varied within wide limits.

All embodiments above described have the common feature that the valve is held in open position only when the vacuum within the pipe sections is maintained above a predetermined degree. On the application of the teat cups to the teats, the difficulty would arise of preventing the closure of the shut-off valve during the short time that the teat cups are open to atmosphere, with the result that when the teat cups are applied, they slip off the teats. In order to obviate this difficulty, the valve may be so arranged as to be easily locked in its open position during application of the teat cups and then released. Figs. 7 and 8 show how this may be effected by means of a pin attached to the movable part. When said part assumes such a position that the channels 1 and 2 communicate, locking may be effected by a rotative movement whereby the pin $21^1$ in Fig. 7 is caused to bear on the lower surface of the cover and the pin $22^1$ in Fig. 8 engages a notch $23^1$ perpendicular to the guiding groove.

While ordinarily the medium surrounding the valve casing will be the atmosphere, it is not intended to exclude any equivalent arrangement wherein the absolute pressure of the surrounding medium is substantially above the normal absolute pressure of the medium within the pipe sections.

What I claim is:

1. In a milking machine characterized by piping in which a partial vacuum is normally maintained, the combination of an automatic cut-off valve interposed in said piping, a valve actuator having opposed pressure surfaces open respectively to said partial vacuum and to the atmosphere and tending by said unbalanced pressure to maintain said cut-off valve in position to establish communication between said pipe sections, and tension means operating against said atmospheric pressure and tending in cooperation with the absolute pressure of said partial vacuum to move the cut-off valve into position to close communication between said pipe sections but not of sufficient strength to so move said valve during the maintenance of a predetermined degree of partial vacuum within the piping adjacent the valve, while operable to so move said valve when said partial vacuum falls below predetermined degree.

2. The device set forth in claim 1 combined with means to positively lock the cut-off valve in position to maintain said communication open while the piping is temporarily in communication with atmosphere.

In testimony whereof I affix my signature in presence of two witnesses.

SVEN JOHAN ERLING.

Witnesses:
 ERIC HALGER,
 NILS HANSSON.